United States Patent Office 2,831,015
Patented Apr. 15, 1958

2,831,015

O-(CHLOROPHENYL) O-(CHLOROPHENOXY-ETHYL) PHOSPHOROTHIOATES

Henry Tolkmith, Midland, Mich., assignor to The Dow Chemical Company, Midland, Mich., a corporation of Delaware No Drawing. Application April 30, 1956
Serial No. 581,359

6 Claims. (Cl. 260—461)

This invention is concerned with the O-(chlorophenyl) O-(chlorophenoxyethyl) phosphorothioates having the formula

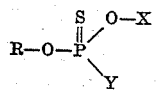

In this and succeeding formulas R represents chlorophenyl, X represents chlorophenoxyethyl and Y represents a lower alkoxy group containing not more than four carbon atoms or an amido group. These new compounds are crystalline solids or viscous liquids somewhat soluble in organic solvents and substantially insoluble in water. They have been found to be active as parasiticides and herbicides and are adapted to be employed as active toxic constituents of compositions for the control of bacteria, fungi, mites, undesirable vegetation and insect organisms such as bean aphids and houseflies.

The new compounds may be prepared by several methods. In one method for preparing the compounds containing an amido group an amine is reacted with a phosphorochloridothioate of the formula

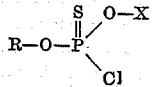

The reaction is carried out in the presence of an insert organic solvent such as benzene, toluene or ether. The reaction is somewhat exothermic and takes place smoothly in the temperature range of from 0° to 40° C. with the formation of the desired product and amine hydrochloride of reaction. The temperature may be controlled by regulating the rate of contacting the reactants and by external cooling. Good results are obtained when employing at least two molecular proportions of amine reagent with each molecular proportion of the phosphorochloridothioate reagent.

In carrying out the reaction, the amine reagent is added portionwise to the phosphorochloridothioate reagent dispersed in the reaction solvent. This operation is carried out with stirring and at a temperature of from 0° to 40° C. Upon completion of the reaction, the reaction mixture may be washed with water and any reaction solvent removed by evaporation to obtain the desired product as a residue.

In a method for preparing the O-(chlorophenyl) O-lower alkyl O-(chlorophenoxyethyl) phosphorothioates of the present invention, said new compounds may be prepared by reacting an alkali metal alcoholate with a phosphorochloridothioate of the formula

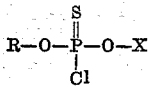

The reaction is somewhat exothermic and takes place smoothly at temperatures of from 30° to 80° C. The temperature may be controlled by regulating the rate of contacting the reagents and by external cooling. Good results are obtained when employing substantially equimolecular proportions of the reagents. The reaction is carried out in a solvent such as benzene, toluene or ethylene dichloride and conveniently in the alcohol employed in the preparation of the alcoholate. In carrying out the reaction, the alcoholate, preferably as the sodium salt, is added portionwise at the reaction temperature to the phosphorochloridothioate reagent dispersed in the reaction solvent. Upon completion of the reaction, the reaction mixture is washed with water to remove the sodium chloride and the solvent removed by evaporation to obtain the desired product as a residue.

In another method, the O-(chlorophenyl) O-lower alkyl O-(chlorophenoxyethyl) phosphorothioates and O-(chlorophenyl) O-(chlorophenoxyethyl) phosphoroamidothioates of the present invention may be prepared by reacting equimolecular proportions of a sodium chlorophenoxyethylate and a phosphorochloridothioate of the formula

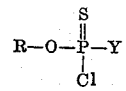

The conditions of reaction, contacting of the reagents and methods of separation are as described above for the alkali metal alcoholate reaction.

The expressions "lower alkyl" and "lower alkoxy" wherever employed in the present specification and claims refer to alkyl and alkoxy groups containing from one to four carbon atoms, inclusive.

The following examples illustrate the invention but are not to be construed as a limitation thereof.

EXAMPLE 1

O-(2,4,5-trichlorophenyl) O-2-(2,4,5-trichlorophenoxy)-ethyl N-isopropyl phosphoroamidothioate

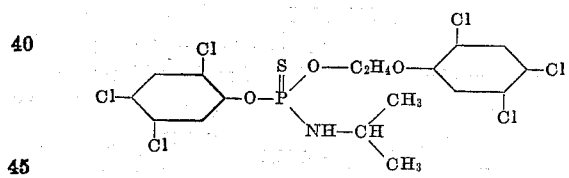

A solution of 14 grams (0.237 mole) of isopropylamine in 100 milliliters of ether was added portionwise with stirring to a solution of 60.3 grams (0.112 mole) of O-(2,4,5-trichlorophenyl) O-2-(2,4,5-trichlorophenoxy)-ethyl phosphorochloridothioate in 250 milliliters of ether. The addition was carried out in 30 minutes and at a temperature of 10° C. Upon completion of the reaction, the isopropylamine hydrochloride formed was removed by filtration and the solvent evaporated from the filtrate. There was obtained as a solid residue an O-(2,4,5-trichlorophenyl) O-2-(2,4,5-trichlorophenoxy)-ether N-isopropyl phosphoroamidothioate product. This product was recrystallized from methanol and found to melt at 78° C.

EXAMPLE 2

O-(2,4-dichloro-5-methylphenyl) O-2-(4-chloro-2-methylphenoxy)ethyl N-benzyl phosphoroamidothioate

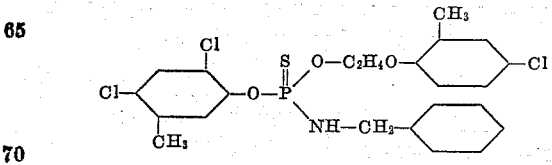

A solution of 0.1 mole of sodium 2-(4-chloro-2-methylphenoxy)-ethylate in 150 milliliters of toluene and a solution of 0.1 mole of O-(2,4-dichloro-5-methylphenyl) N-benzyl phosphorochloridothioate in 200 milliliters of benzene was blended at room temperature. The mixture was then heated at the boiling point (92° C.) and under reflux for eight hours. Upon completion of the reaction, the reaction mixture was washed with water and the solvent evaporated. There was obtained an O-(2,4-dichloro-5-methylphenyl) O-2-(4-chloro-2-methylphenoxy)ethyl N-benzyl phosphoroamidothioate product as a gold colored viscous liquid. This product was dissolved in petroleum ether, separated from impurities and the solvent evaporated. The resulting product was then found to have a refractive index ($n/D$) of 1.5869 at 20° C.

EXAMPLE 3

*O-(2,4,5-trichlorophenyl) O-methyl O-2-(2,4,5-trichlorophenoxy)-ethyl phosphorothioate*

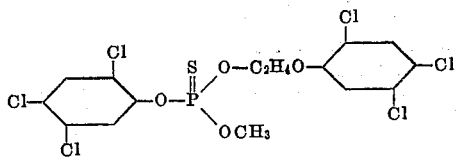

A solution of 0.75 gram (0.018 mole) of sodium hydroxide in 20 milliliters of methanol was added portionwise with stirring to 10 grams (0.018 mole) of O-(2,4,5-trichlorophenyl) O-2-(2,4,5-trichlorophenoxy)ethyl phosphorochloridothioate dissolved in a mixture of 25 milliliters of methanol and 25 milliliters of methylene chloride. The reaction mixture was stirred at room temperature for seven hours to complete the reaction and then acidified with dilute acetic acid. The sodium chloride formed as removed by washing the reaction mixture with water. Upon evaporation of the organic solvent there was obtained as a liquid residue an O-(2,4,5-trichlorophenyl) O-methyl O-2-(2,4,5-trichlorophenoxy)ethyl phosphorothioate product which solidified on standing. This product was recrystallized from methanol and found to melt at 85° to 86° C.

EXAMPLE 4

*O-(2,4,5-trichlorophenyl) O-secondarybutyl O-2-(4-chloro-2-methylphenoxy)ethyl phosphorothioate*

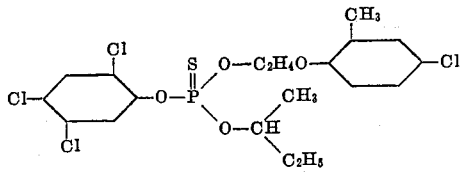

A solution of 0.027 mole of O-(2,4,5-trichlorophenyl) O-secondarybutyl phosphorochloridothioate in 75 milliliters of benzene was blended with a solution of 0.027 mole of sodium 4-chloro-2-methylphenoxyethylate in 40 milliliters of toluene. The mixture was stirred and heated slowly from room temperature to 45° C. over a period of eight hours. Upon completion of the reaction, the reaction mixture was washed with water and the solvent evaporated to obtain an O-(2,4,5-trichlorophenyl) O-secondarybutyl O-2-(4-chloro-2-methylphenoxy)ethyl phosphorothioate product as a viscous, dark-brown liquid. This product had a refractive index ($n/D$) of 1.5629 at 20° C.

EXAMPLE 5

*O-(4-chlorophenyl) O-2-(2,4-dichlorophenoxy)ethyl N-methyl phosphoroamidothioate*

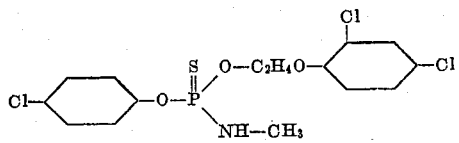

A solution of 15.5 grams (0.5 mole) of methylamine in 100 milliliters of ether is added portionwise with stirring to a solution of 103 grams (0.24 mole) of O-(4-chlorophenyl) O-2-(2,4-dichlorophenoxy)ethyl phosphorochloridothioate in 300 milliliters of ether. The addition is carried out in one hour and at a temperature of 15° C. Upon completion of the reaction, the methylamine hydrochloride formed is removed by filtration and the ether evaporated from the filtrate. There is obtained as a residue an O-(4-chlorophenyl) O-2-(2,4-dichlorophenoxy)ethyl N-methyl phosphoroamidothioate product having a molecular weight of 410.

In a similar manner other O-(chlorophenyl) O-(chlorophenoxyethyl) phosphorothioates may be prepared of which the following are representative:

O-(2,4-dichlorophenyl) O-2-(3,4-dichlorophenoxy)-ethyl N-ethyl phosphoroamidothioate by the reaction of ethylamine and O-(2,4-dichlorophenyl) O-2-(3,4-dichlorophenoxy)ethyl phosphorochloridothioate.

O-(3,4-dichlorophenyl) O-ethyl O-2-(4-chlorophenoxy)ethyl phosphorothioate by the reaction of sodium ethylate and O-(3,4-dichlorophenyl) O-2-(4-chlorophenoxy)ethyl phosphorochloridothiate.

O-(2-chlorophenyl) O-isopropyl O-2-(2,4,5-trichlorophenoxy)ethyl phosphorothioate by the reaction of O-(2-chlorophenyl) O-isopropyl phosphorochloridothioate and sodium 2,4,5-trichlorophenoxyethylate.

The new O-(chlorophenyl) O-(chlorophenoxyethyl) phosphorothioates are effective as herbicides and parasiticides and are adapted to be employed for the control of undesired vegetation such as canary grass and many household and agricultural pests. For such use the products may be dispersed on a finely divided carrier and employed as dusts. The new products may also be employed as oils, as constituents in water emulsions or in water dispersions. In a representative operation 100 percent controls of bean aphids and houseflies have been obtained with aqueous compositions containing 500 parts by weight of O-(2,4,5-trichlorophenyl) O-secondarybutyl-O-2-(4-chloro-2-methylphenoxy)ethyl phosphorothioate per million parts by weight of water.

The O-(chlorophenyl) O-(chlorophenoxyethyl) phosphorochloridothioates employed as starting materials may be prepared by reacting equimolecular proportions of an O-(chlorophenyl) phosphorodichloridothioate and a chlorophenoxyethanol in the presence of an equimolecular proportion of pyridine. The reaction is carried out in the presence of an inert organic solvent such as benzene or toluene and at a temperature of about 75° C. Pyridine dissolved in the reaction solvent is added portionwise with stirring to a solution of the two reactants dissolved in the same solvent. The addition is carried out at room temperature. Following the addition, the temperature of the reaction mixture is gradually raised over a period of several hours to about 75° C. and held there for about an hour to complete the reaction. The pyridine hydrochloride formed is filtered off and the solvent evaporated from the filtrate leaving the desired product as a residue. O-(2,4,5-trichlorophenyl) O-2-(2,4,5-trichlorophenoxy)ethyl phosphorochloridothioate is a crystalline solid which melts at 74° to 76° C.

The O-(chlorophenyl) phosphoroamidochloridothioates also employed as starting materials may be prepared by reacting two molecular proportions of amine with one molecular proportion of an O-(chlorophenyl) phosphorodichloridothioate. The reaction is carried out in the presence of an inert organic solvent such as ether and at a temperature of from 0° to 20° C. A solution of the amine in the reaction solvent is added portionwise with stirring to a solution of the phosphorodichloridothioate in the same solvent. After the addition, the reaction mixture is allowed to stand several hours at room temperature to complete the reaction. The amine hydrochloride formed is removed by filtration and the solvent evaporated from the filtrate to obtain the desired product as residue. O-(2,4-dichloro-5-methylphenyl) N-benzyl phosphorochloridothioate is a white solid which melts at 82° C.

I claim:

1. An O-(chlorophenyl) O-(chlorophenoxyethyl) phosphorothioate having the formula

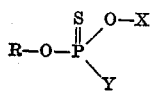

wherein R represents a member of the group consisting of 2-chlorophenyl, 4-chlorophenyl, 2,4-dichlorophenyl, 3,4-dichlorophenyl, 2,4,5-trichlorophenyl and 2,4-dichloro-5-methylphenyl, X represents a member of the group consisting of 4-chlorophenoxyethyl, 2,4-dichlorophenoxyethyl, 3,4-dichlorophenoxyethyl, 4-chloro-2-methylphenoxyethyl and 2,4,5-trichlorophenoxyethyl and Y represents a member of the group consisting of monoloweralkylamido, monobenzylamido and lower alkoxy.

2. O-(2,4,5-trichlorophenyl) O-2-(2,4,5-trichlorophenoxy)ethyl N-isopropyl phosphoroamidothioate.

3. O-(2,4-dichloro-5-methylphenyl) O-2-(4-chloro-2-methylphenoxy)ethyl N-benzyl phosphoroamidothioate.

4. O-(2,4,5-trichlorophenyl) O-methyl O-2-(2,4,5-trichlorophenoxy)ethyl phosphorothioate.

5. O-(2,4,5-trichlorophenyl) O-secondarybutyl O-2-(4-chloro-2-methylphenoxy)ethyl phosphorothioate.

6. O-(4-chlorophenyl) O-2-(2,4-dichlorophenoxy)ethyl N-methyl phosphoroamidothioate.

No references cited.